United States Patent [19]

Price, Jr.

[11] 4,048,897
[45] Sept. 20, 1977

[54] LATERALLY ENGAGABLE AND RELEASABLE NUT ASSEMBLY

[76] Inventor: Ellie Edward Price, Jr., Rte. 13, Box 166, Charlotte, N.C. 28213

[21] Appl. No.: 684,486

[22] Filed: May 10, 1976

[51] Int. Cl.² ............................................. F16B 37/08
[52] U.S. Cl. ................................... 85/33; 74/424.8 A
[58] Field of Search ................................ 85/32 J, 33; 70/424.8 A; 269/173, 174, 175, 176, 177, 181, 182, 183

[56] References Cited
U.S. PATENT DOCUMENTS

| 463,301 | 11/1891 | Brander | 74/424.8 A |
| 721,023 | 2/1903 | Gosper | 74/424.8 A X |
| 844,469 | 2/1907 | Prouty | 74/424.8 A |
| 1,106,096 | 8/1914 | Hunt | 269/182 |
| 1,722,783 | 7/1929 | Basseches | 85/32 UX |
| 1,879,421 | 9/1932 | Nalle | 85/33 UX |
| 2,153,474 | 4/1939 | Naylor | 24/135 N |
| 2,355,679 | 8/1944 | Roxs et al. | 85/33 |
| 2,736,227 | 2/1956 | Stroble | 85/33 |
| 3,343,440 | 9/1967 | Jones et al. | 85/33 |
| 3,431,623 | 3/1969 | Smeets | 85/33 X |

FOREIGN PATENT DOCUMENTS

| 830,717 | 1/1952 | Germany | 85/33 |
| 30,851 | 3/1970 | Japan | 85/33 |

Primary Examiner—Roy D. Frazier
Assistant Examiner—Thomas J. Holko
Attorney, Agent, or Firm—Robert Brown, Jr.

[57] ABSTRACT

A nut provided with a U-shaped slot laterally and threadably engagable with a rod or shaft, in combination with a C-shaped retainer member mounted on the nut and manually rotatable thereon to selectively: (a) confine the nut on the shaft in relatively rotatable lateral engagement, (b) lock the nut and shaft against relative rotation, and (c) connect the nut and shaft for yielding lateral threaded engagement and disengagement.

8 Claims, 14 Drawing Figures

LATERALLY ENGAGABLE AND RELEASABLE NUT ASSEMBLY

PRIOR ART

Heretofore, numerous types of stops and guides have been provided for use on drilling, depth milling and other machinery of the type illustrated in FIG. 1A of the present application, as well as for fastening devices such as disclosed in U.S. Pat. Nos. 2,153,474 and 3,431,623.

FIG. 1A shows a portion of a commercially available "Bridgeport" milling attachment 10 equipped with quill 11 which can be reciprocated manually by handle 12. Attached to the quill and moving with it is a solid quill stop 14; and attached to the machine is a long fine-threaded rod or shaft 15 on which is mounted a non-removable stop nut 16 and lock nut 17. These nuts, used together, provide positive means for controlling the drilling and milling depth setting of the quill in a well known manner.

However, since the quill 11 has a travel range of five inches and a depth stop may be required at any point along this range, it becomes evident that much time is wasted while manually running the movable nuts up and down the threaded rod 15. The latter operation is especially time consuming and irritating when the threads are dirty and while the operator is engaged in producing short-run lots of work, each requiring a different stopping position of the movable nuts on the shaft 15. Often, because of this inconvenience, the operator will not use the movable nuts 16 and 17, preferring instead to sight depth by eye with the aid of the 5-inch scale 20 attached to the machine. He thus produces less accurate work than would be the case if the stop and lock nuts were used, especially if the nuts could be easily, quickly and accurately set to selected locations. The need clearly exists for such a quickly positionable nut.

Similar difficulties are experienced when adjusting the positions of nuts or clamps of the type shown in the aforementioned patents.

It is therefore an object of this invention to provide a slip-on nut which will obviate the above deficiencies in the prior art construction.

It is another object of this invention to provide an improved slip-on nut of the class described which, when positioned upon a threaded shaft, can be quickly confined in rotatable threaded engagement with the shaft, or else locked in fixed position.

It is yet another object of the invention to provide a laterally engagable slip-on nut for threadably engaging a shaft, which nut comprises a pair of laterally slotted ring members rotatably mounted one upon the other, in combination with rigid means responsive to relative rotation of the members for confining one of them in lateral threaded engagement with the shaft while remaining relatively rotatable on the latter, for locking the members in lateral threaded engagement on the shaft, and for connecting the nut and shaft for yielding lateral threaded engagement and disengagement.

Some of the objects of the invention having been stated, other objects will appear as the description proceeds when taken in connection with the accompanying drawings, in which, FIG. 1 is an elevation of my improved stop nut 25 assembly mounted on a threaded shaft 15;

Figures 1A, 6:
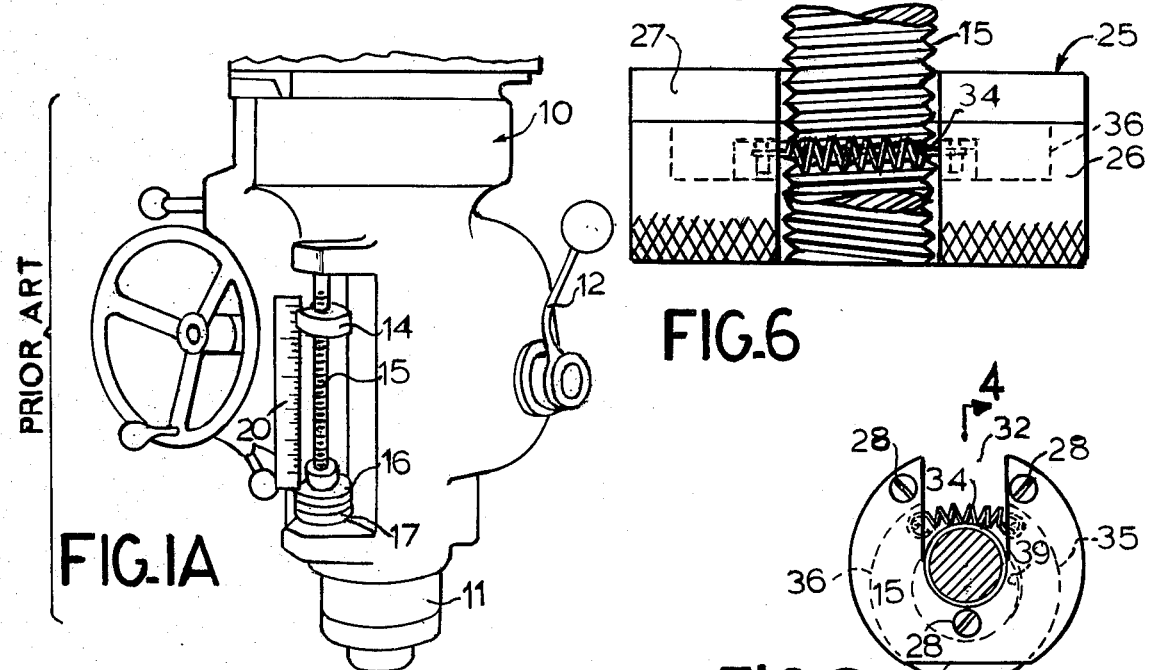
FIG. 1A is a schematic view of a milling machine attachment provided with a conventional stop nut 16, 17.
FIG. 6 is an elevation looking at the back side of FIGS. 1 and 5.
Figure 1:
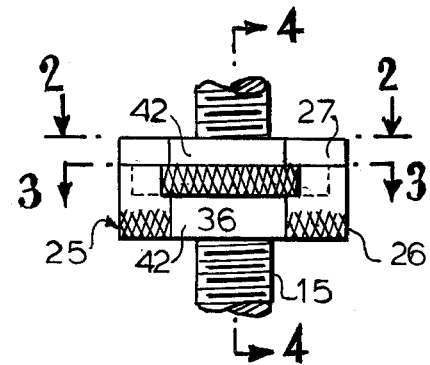
Figure 11:
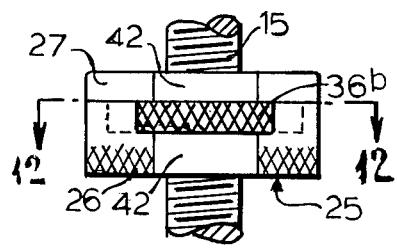
Figure 7:
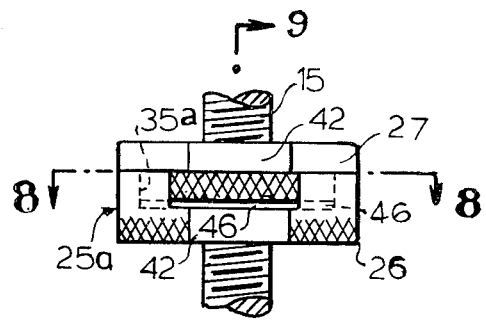
FIG. 7 is an elevational view similar to FIG. 1, showing a modified form of the invention.
Figure 12:
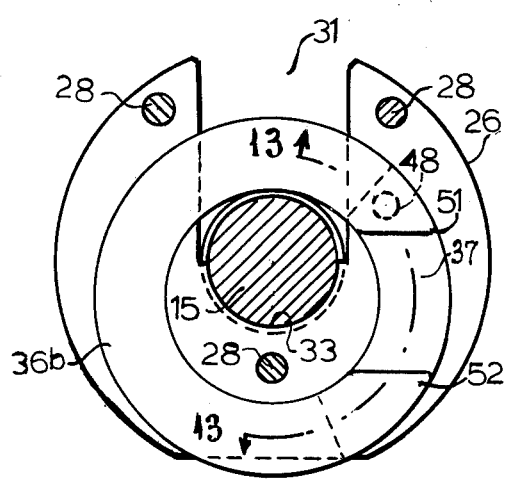
Figure 8:
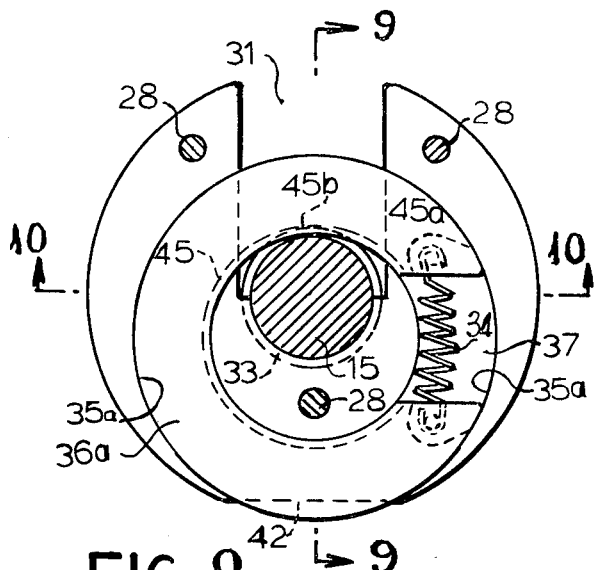
FIG. 8 is an enlarged sectional plan view taken along line 8—8 in FIG. 7.
Figure 10:
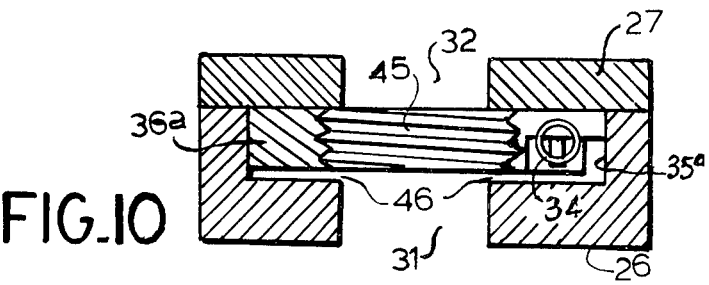

FIG. 10 is a sectional view taken along line 10—10 in FIG. 8, but with the threaded shaft 15 omitted and showing the interior threaded circumference of retainer ring 36a;

FIG. 11 is a view similar to FIG. 1, showing another modified form of the invention;

FIG. 12 is a sectional plan view taken along line 12—12 in FIG. 11, and

Figure 13:
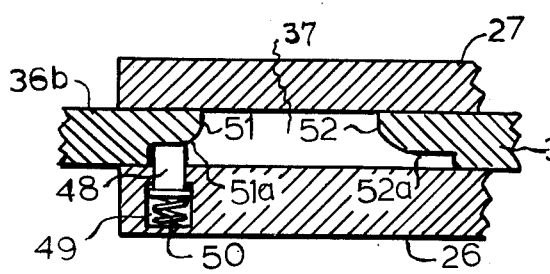
Figure 9:
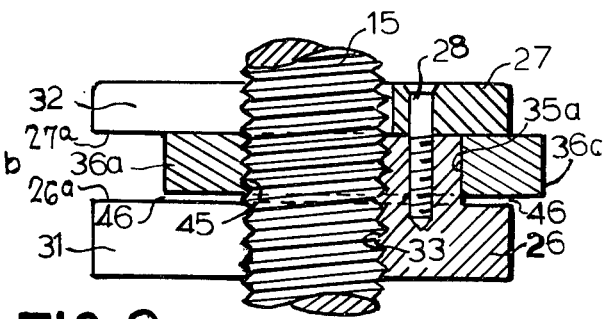
FIG. 9 is a vertical sectional view taken along lines 9—9 in FIGS. 7 and 8.

FIG. 13 is a developed sectional view taken along circumferential arc segment 13—13 in FIG. 12.

Referring more particularly to FIGS. 1 and 2 through 6, the numeral 25 broadly designates a nut assembly according to the invention, said assembly comprising base and cover elements 26 and 27 respectively, which are detachably connected to one another by suitable means such as screws 28. The element 26 is provided with a lateral slot 31 extending from its perimeter to the central portion thereof, said cover element 27 having a slot 32 coinciding with the base slot. The centrally disposed end wall of base slot 31 is tapped with semicircular threads 33 which match the threads on shaft 15. It will be observed that the slots 31 and 32 each has a width at least equal to the diameter of the shaft to permit lateral threaded engagement and disengagement between the shaft and nut assembly.

The upper face of base element 26 has a circular groove 35 therein (FIG. 5), which groove is eccentrically disposed and substantially surrounds the semicircular threaded end wall 33 of slot 31. Groove 35 is also eccentrically disposed relative shaft 15, said groove having an arcuate member or ring 36 rotatably mounted therein. Ring 36 has a peripheral slot or gap 37 of a width at least equal to the diameter of shaft 15 and coincidable with slots 31 and 32 to permit lateral threaded engagement and disengagement between the shaft and the nut assembly.

The inside circumference of ring 36 is provided with an outwardly tapered cam surface 39 between points 40 and 41 (FIGS. 2, 3 and 5), said surface being adapted to engage the threaded periphery of the shaft as at 33. It is important to note that during the initial rotation of cam surface 39 from the position shown in FIG. 5 toward the locking position in FIG. 3, it passes through an intermediate position in which the shaft 15 and assembly 25 are confined in relatively rotatable threaded engagement by the ring.

Figure 4:
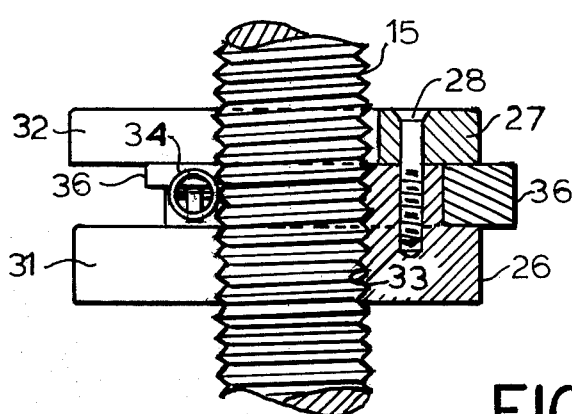
FIG. 4 is an enlarged vertical sectional view taken along lines 4—4 in FIGS. 1 and 2.
Figure 5:
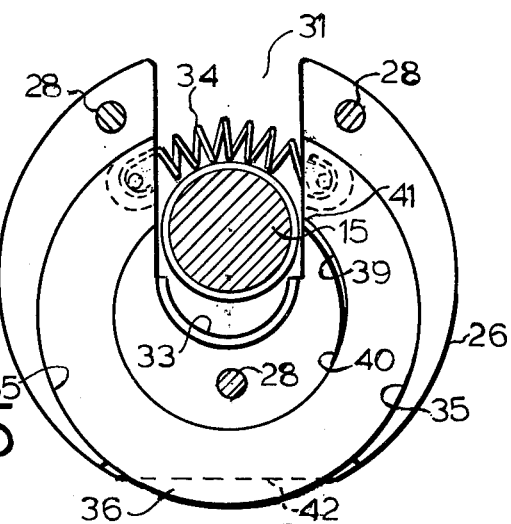
FIG. 5 is an enlarged view similar to FIG. 2, showing the nut assembly yieldingly connected to the shaft in a laterally disengagable threaded position.
Figure 2:
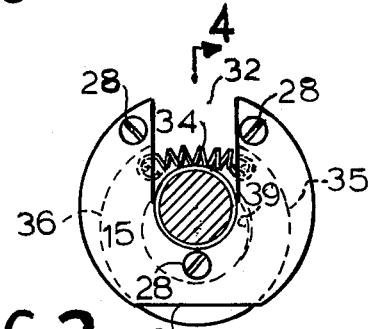
FIG. 2 is a sectional plan view taken along line 2—2 in FIG. 1.
Figure 3:
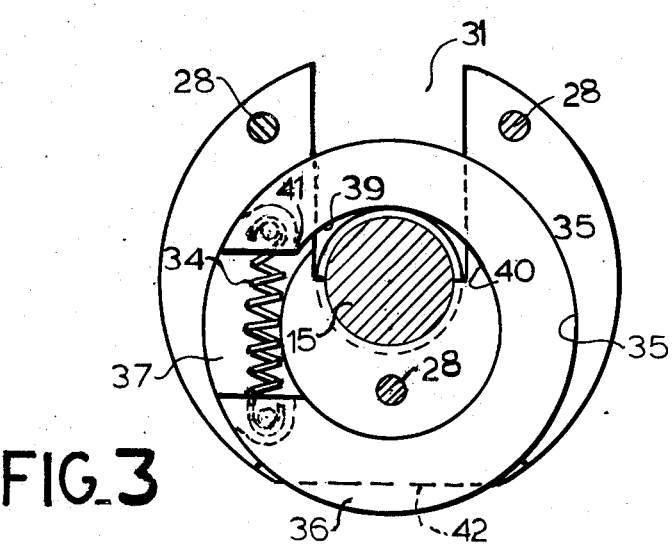
FIG. 3 is an enlarged sectional plan view taken along line 3—3 in FIG. 1, showing the nut assembly rigidly held in lateral threaded engagement with the shaft.

For certain applications, it may be desired to place the assembly 25 in operating position upon shaft 15 and retain it so that it cannot fall off, even when not prevented from doing so by the ring 36. This may be accomplished by using a flexible removable member such as tension spring 34 across the slot or gap 37 of the ring. This spring has its opposite ends connected to and bridging the ends of the C-shaped ring 36 so as to be quickly removed or installed. When installed on the shaft as shown in FIGS. 2, 5 and 6, the spring 34 is the only means of holding the nut assembly in threaded engagement with the shaft. Moreover, the spring permits the assembly and shaft to be engaged or disengaged against spring tension when it is desired to quickly reposition the assembly to another point longitudinally of the shaft.

In use, the assembly 25 is laterally inserted upon the threaded shaft 15 to the approximate desired position (FIGS. 2 and 6). If the shaft 15 has its opposite ends mounted so that the assembly cannot be inserted endwise, the removable spring 34 is first detached from ring 36 to permit the lateral insertion. Then the ring is rotated in a counterclockwise direction transversely of slots 31, 32 and 37 to a position intermediate that shown in FIG. 5 to that shown in FIG. 3, at which time the shaft and assembly are confined in relatively rotatable engagement with one another to permit the user to manually rotate the assembly 25 to the precise position desired. If it is then desired to lock the assembly upon the shaft, the ring 36 is rotated from its intermediate position to the position shown in FIG. 3 to cause the cam surface 39 to press the assembly firmly against the threaded slot end 33 of element 26.

The periphery of ring 36 extends outwardly beyond the peripheries of base and cover elements 26 and 27 as at 42 (FIGS. 2, 3 and 5) to permit ready manual access a segment of to the ring. It will be observed that the connected base and cover elements 26, 27 form a substantially cylindrical unit in which the relatively smaller annular ring 36 is eccentrically and rotatably mounted. An outer peripheral segment of the ring intersects an outer peripheral segment of the unit, thereby exposing the ring segment for engagement by an operator's thumb while the unit is held in the same hand.

FIGS. 7 through 10 show a modified form of the invention similar to the embodiment described above, except the retention ring 36a operates as a jam nut to lock assembly on shaft 15 instead of the cam means 39. Ring 36a may also assume an intermediate position on shaft 15 corresponding to that described above in which the assembly is confined in a relatively rotatable position on the shaft while manually rotating it to its precise position, that is, to effect a vernier adjustment. More particularly, the ring 36a is provided with threads 45 on its inside periphery which engage threaded shaft 15.

During use, the slots 31, 32 and 37 of assembly 25a are first rotated to coinciding position, after which the assembly is inserted upon the shaft to the approximate position longitudinally of the shaft. The vernier adjustment to the exact position is then manually effected to cause the threads 45 to engage the shaft threads at point 45b which are diametrically opposite the slot end threads 33, thereby confining the assembly in locked position on the shaft. It should be noted, however, that the jam nut locking effect requires a clearance 46 sufficient to allow enough vertical movement of ring 36a relative to the proximate faces 26a and 27a of elements 26 and 27 respectively, as the ring rotates to and from its locking position shown in FIG. 9. The threads 45 of ring 36a in the locking position are continuations of the threads which confine the assembly and shaft in relatively rotatable position as described above.

FIGS. 11, 12 and 13 show a slightly modified form of the invention, similar to the embodiment shown in FIGS. 1 through 5 but omitting the cam locking feature 39 and adding a latching feature to hold retention ring 36b in an insertable position. The latch comprises a detent 48 mounted in bore 49 of base element 26, said detent having its upper end (FIG. 13) normally biased by spring 50 into the paths of ring ends 51 and 52. When ring 36b is in the shaft confining position shown in FIGS. 12 and 13, the detent releasably engages the notch 51a to releasably latch the ring in a position in which the slots 31 and 32 do not coincide with ring gap 37; and when the ring is in a releasable position with the slots coinciding, the detent engages the ring end notch 52a which serves as a stop. It is evident that ring 36a may be provided with a lateral retention spring 34, previously described, when desired.

I claim:

1. In combination, a nut (26) provided with a centrally disposed threaded bore (33) and a U-shaped slot (31) extending outwardly therefrom to permit lateral insertion of the nut upon a threaded shaft (15);
   a C-shaped retainer ring (36) mounted for rotation on said nut (26) in a path encircling said bore (33);
   means operable in response to the rotation of said ring for selectively
   confining said nut (26) and shaft (15) in relatively rotatable lateral threaded engagement with one another, and
   connecting the nut and shaft for yielding lateral threaded engagement and disengagement;
   said selectively operable means including a tension spring (34) bridging the gap in said C-shaped ring, the ends of said spring being detachably secured to the ends of said ring respectively, and
   cam means (39) operable in response to the rotation of said ring for locking said nut and shaft in fixed relative position.

2. A laterally enagagable and releasable nut assembly (25) for a threaded shaft (15) comprising
   a nut (26) having a slot (31) extending laterally inwardly from its perimeter to a central portion thereof, the inner end (33) of said slot being threaded to match the threads of said shaft;
   said slot having a width at least equal to the diameter of said shaft to permit the nut to be inserted into and removed from threaded engagement with the shaft;
   a retainer ring (36) mounted for rotation on said nut in a circular path surrounding said shaft, said ring having a gap therein coincidable with said slot;
   means (27) for preventing relative movement between said nut and ring axially of said assembly, and
   cam means (39) on said ring and responsive to the rotation of the ring to a position across said slot for fixedly locking the nut assembly and shaft against relative rotation.

3. The laterally engagable and releasable nut assembly defined in claim 2 wherein said cam means (39) is provided on the inner periphery of said ring.

4. The laterally engagable and releasable nut assembly defined in claim 3 wherein said cam means (39) tangentially engages said threaded shaft at a point diametrically opposite said threaded engagement of the latter with said slot inner end (33).

5. The laterally engagable and releasable nut assembly defined in claim 4 wherein the assembly is substantially cylindrical and axially concentric with said shaft when the latter is in threaded engagement therewith, and wherein said ring has a relatively smaller outer diameter than, and is substantially housed within the periphery of the assembly, said ring being mounted eccentrically of the assembly to cause a segment of the ring outer periphery to intersect a segment of the cylindrical assembly periphery, whereby said ring segment is exposed for manual engagement to rotate the ring.

6. The laterally engagable and releasable nut assembly defined in claim 4 wherein said cam means (39) is responsive to the rotation of the ring to a second position across said nut slot for releasing the assembly from said fixed locked position and for confining it upon the shaft in relatively rotatable threaded engagement therewith.

7. The laterally engagable and releasable nut assembly defined in claim 6 and further comprising a tension spring (34) bridging said ring gap to yieldingly press the assembly into lateral threaded engagement with the shaf when said gap and slot are in coinciding position.

8. The laterally engagable and releasable nut assembly defined in claim 2 wherein the assembly is substantially cylindrical and axially concentric with said shaft when the latter is in threaded engagement therewith, and wherein said ring has a relatively smaller outer diameter than, and is substantially housed within the periphery of the assembly, said ring being mounted eccentrically of the assembly to cause a segment of the ring outer periphery to intersect a segment of the cylindrical assembly periphery, whereby said ring segment is exposed for manual engagement to rotate the ring.

* * * * *